United States Patent
Sundaresan

(10) Patent No.: US 8,218,472 B2
(45) Date of Patent: Jul. 10, 2012

(54) SYSTEMS AND METHODS FOR LEVERAGING SPATIAL REUSE IN OFDMA RELAY NETWORKS

(75) Inventor: Karthikeyan Sundaresan, Howell, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 644 days.

(21) Appl. No.: 12/388,398

(22) Filed: Feb. 18, 2009

(65) Prior Publication Data

US 2010/0046414 A1 Feb. 25, 2010

Related U.S. Application Data

(60) Provisional application No. 61/090,698, filed on Aug. 21, 2008.

(51) Int. Cl.
*H04B 7/14* (2006.01)
*H04W 4/00* (2009.01)

(52) U.S. Cl. ......................................... 370/315; 370/329

(58) Field of Classification Search .................. 370/315, 370/329
See application file for complete search history.

(56) References Cited

U.S. PATENT DOCUMENTS

| | | | | |
|---|---|---|---|---|
| 7,706,403 B2 * | 4/2010 | Hosein | | 370/468 |
| 7,933,350 B2 * | 4/2011 | Liu et al. | | 375/260 |
| 8,031,605 B2 * | 10/2011 | Oyman et al. | | 370/235 |
| 2007/0126630 A1 | 6/2007 | Coppi | | |
| 2007/0211757 A1 * | 9/2007 | Oyman | | 370/468 |
| 2008/0108369 A1 * | 5/2008 | Visotsky et al. | | 455/455 |
| 2008/0123579 A1 | 5/2008 | Kozat et al. | | |
| 2008/0137581 A1 | 6/2008 | Doppler et al. | | |
| 2008/0181318 A1 | 7/2008 | Kim et al. | | |
| 2008/0204319 A1 | 8/2008 | Niu et al. | | |
| 2008/0214182 A1 | 9/2008 | Wang | | |
| 2008/0219373 A1 | 9/2008 | Zhang et al. | | |
| 2008/0225774 A1 * | 9/2008 | Kim et al. | | 370/315 |
| 2008/0274692 A1 | 11/2008 | Larsson | | |
| 2008/0316143 A1 | 12/2008 | Chen et al. | | |
| 2009/0003260 A1 * | 1/2009 | Guo et al. | | 370/315 |
| 2009/0080366 A1 | 3/2009 | Shao et al. | | |
| 2009/0080544 A1 * | 3/2009 | Yin | | 375/260 |
| 2009/0109093 A1 | 4/2009 | Sun et al. | | |
| 2009/0190536 A1 | 7/2009 | Zhang et al. | | |
| 2009/0213779 A1 | 8/2009 | Zhang et al. | | |
| 2009/0303918 A1 * | 12/2009 | Ma et al. | | 370/315 |
| 2011/0199957 A1 * | 8/2011 | Oyman et al. | | 370/315 |

* cited by examiner

*Primary Examiner* — Kenny Lin
*Assistant Examiner* — Faisal Choudhury
(74) *Attorney, Agent, or Firm* — Bao Tran; Joseph Kolodka

(57) ABSTRACT

Systems and methods for scheduling transmission that leverages both diversity and spatial reuse gains in the presence of finite user buffers in a two-hop wireless relay setting are disclosed. The system includes partitioning a set of relays to enable spatial reuse while accounting for half-duplex nature of relays, and assigning and reusing of channels to the relays (and associated users) in the two partitions to maximize the aggregate system throughput while ensuring proportional fairness.

7 Claims, 6 Drawing Sheets

301 — For a given channel: Find user pair that provides maximum utility in presence of finite buffer and interference. Update the buffer of users in chosen pair. Repeat for remaining channels.

302 — Given the set of chosen user pairs for all channels as V, run the algorithm in 200 to restore partition feasibility. Output a feasible schedule.

SYSTEMS AND METHODS FOR LEVERAGING SPATIAL REUSE IN OFDMA RELAY NETWORKS

This application claims priority to U.S. Provisional Application Ser. No. 61/090,698 filed Aug. 21, 2008, the content of which is incorporated by reference.

BACKGROUND

The last decade has seen a significant amount of research in multi-hop wireless networks (MWNs). While their completely decentralized nature has contributed to scalable solutions, they have also faced significant challenges in moving towards commercial adoption. However, with the next generation wireless networks moving towards smaller (micro, pico) cells for providing higher data rates, there is a revived interest in MWNs from the perspective of integrating them with infrastructure wireless networks. With a decrease in cell size, relays are now needed to provide extended coverage, resulting in a multi-hop network.

User and channel diversity gains, available in conventional one-hop cellular networks, have been effectively leveraged to improve system performance through several channel-dependent scheduling schemes. However, they do not provide spatial reuse. MWNs on the other hand, provide spatial reuse although their large scale makes it difficult to provide hard performance guarantees. Further, since diversity gains require channel state feedback from relay stations and mobile users and must be exploited at fine time scales (order of frames), they cannot be effectively leveraged in a large multi-hop setting. Relay-enabled networks with a two-hop structure, provide a unique middle-ground between these two networks, providing us access to a multitude of diversity and spatial reuse gains. While this provides potential for significant performance improvement, it also calls for more sophisticated, tailored scheduling solutions that take into account the two-hop nature of the system.

Relay-enabled wireless networks have been used to provide improved coverage and capacity. These networks have gained attention both in the standards community (IEEE 802.16j) and in the industry. Scheduling, being a key component in these networks, has received higher emphasis. These systems are typically the TDMA variants where the scheduling decision reduces mainly to deciding whether to employ a relay or not and for which particular user. They focus on link level performance and do not exploit (i) multiple OFDM channels, and (ii) spatial reuse and diversity across the relay and access hops that is available at a network level.

Scheduling forms a crucial component in the efficient exploitation of the spatial reuse and diversity gains delivered by the two-hop relay-assisted cellular networks. Conventional systems leverage only the multi-user and channel diversity gains available in one hop cellular networks. On the other hand, conventional systems that consider scheduling in relay networks do not leverage spatial reuse across hops. Further, conventional relay scheduling solutions do not incorporate finite data in user buffers and instead assume backlogged data. In fact, data in user buffers is limited in practice and incorporation of this aspect along with spatial reuse changes the problem completely, making it more difficult.

SUMMARY

Figure 1A:
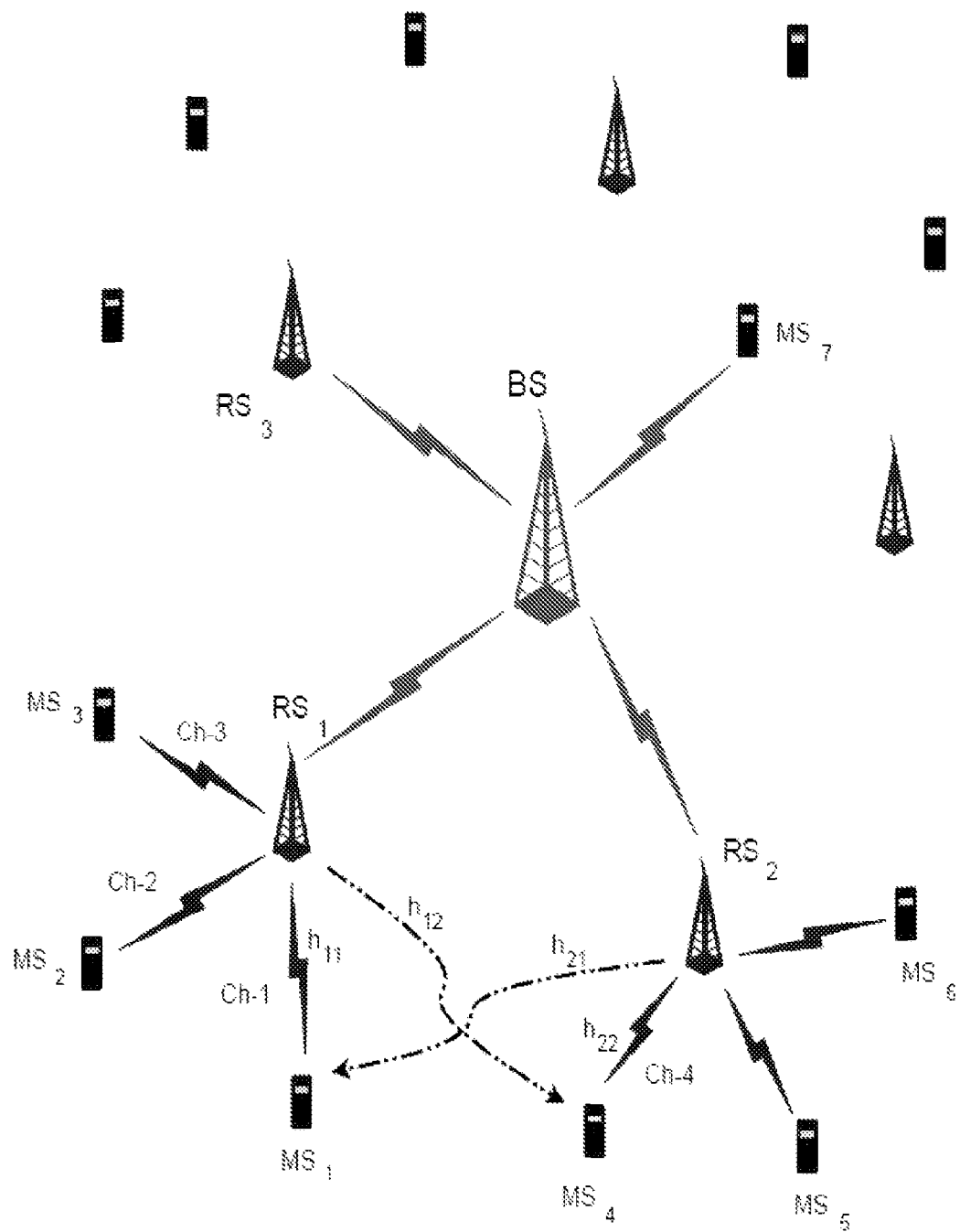
FIG. 1 is an exemplary block diagram showing a multi hop wireless relay network, associated gains and transmission frame structure.

Systems and methods for scheduling transmission that leverages both diversity and spatial reuse gains in the presence of finite user buffers in a two-hop wireless relay setting are disclosed.

In one aspect, the system includes partitioning a set of relays to enable spatial reuse while accounting for half-duplex nature of relays, and assigning and reusing of channels to the relays (and associated users) in the two partitions to maximize the aggregate system throughput while ensuring proportional fairness.

In another aspect, a method for scheduling transmissions in a relay-enabled two-hop wireless network includes: partitioning a set of relays to enable spatial reuse while accounting for half-duplex nature of relays, and assigning and reusing of channels across the relays (and associated users) in the two partitions to maximize the aggregate system throughput while ensuring proportional fairness.

Implementations of the above aspect may include one or more of the following. The method includes grouping wireless sub-carriers to form one or more sub-channels. The grouping can be a distributed model. The method can apply a $5/12$-approximation for the finite buffer model and such the grouping can be a contiguous permutation models. The method can include applying a $3/4$-approximation for the back-logged buffer model or a $3/8$-approximation for the finite buffer model. The grouping can be a Partially Used Subchannelization (PUSC) model. The method can include arranging relays in circular geometry while considering all contiguous partitions of the relay set; for each contiguous partition, determining the schedule of maximum utility; and determining the partition that provides the schedule of maximum utility. The method can also include determining a user under each relay in ever pair of relays that provides maximum utility in the presence of finite buffer and interference for a considered channel; selecting the user pair that provides the maximum utility for the considered channel and adding it to the schedule; and updating buffers of scheduled users. The grouping can be an Adaptive Modulation and Coding (AMC) model. The AMC model includes backlogged buffering with determining a user pair for each channel that provides the highest marginal utility, where V is the set of chosen pairs and initial empty partitions include L and R; determining the mapping from the user pair chosen for each channel to their corresponding relay pairs; determining a relay pair (s1,s2) in V of maximum utility weight and checking a partition feasibility for (s1,s2) and (s2,s1) with current {L,R}; determining conflicting pairs of (s1,s2) and (s2,s1) as T1 and T2 respectively; determining a better fit among {(s1,s2), T2} and {(s2,s1), T1} as A and the other as C; adding pairs in A to an existing schedule given by partitions of L and R and adding non-chosen pairs in C to a blocked set B and removing A and C from V; adding the relay (user) from each of the pairs in B that provides the higher utility transmission in isolation to its corresponding partition in {L,R}. The system can include IEEE 802.16j transceivers. The AMC model can include finite buffering by for a given channel, determining a user pair that provides maximum utility with finite buffer and interference; processing the scheduling method from AMC model with backlogged buffering to restore partition feasibility; and generating a feasible transmission schedule.

Advantages of the system may include one or more of the following. The system is efficient with performance guarantees for leveraging spatial reuse in addition to diversity gains. To work with the IEEE 802.16j and 802.16m standards, two sub-carrier grouping embodiments can be used, namely distributed grouping such as Partially Used Subchannelization (PUSC) and contiguous grouping such as Adaptive Modulation and Coding (AMC) permutation models. These models define how the sub-carriers are grouped to form a sub-channel. Under distributed permutation, the hardness of the scheduling problem for the finite buffer case is solved with a $5/12$-approximation process. Under contiguous permutation, the hardness of the scheduling problem under both back-logged and finite buffer cases is solved through a $3/4$-approximation and $3/8$-approximation processes, respectively.

The scheduler provides three solutions that provide high performance and run in polynomial time, making it conducive for real-time implementation at BS at the granularity of frames. The three solutions are for the following cases: (i) PUSC with finite user buffers, (ii) AMC with backlogged user buffers, and (iii) AMC with finite user buffers. The three embodiments provide theoretical guarantees of achieving a worst-case performance within a factor of the optimal. In one implementation, the performance guarantees of the three solutions are within about 10% of practical optimum. The running time complexity of each of these solutions is also low, making them conducive for real-time implementation at BS. The solutions are simple greedy algorithms, whose simplicity makes them conducive for implementation at the base station. The solutions involve two main components: (i) partitioning of set of relays to enable spatial reuse while accounting for half-duplex nature of relays, and (ii) assignment and reuse of channels to the relays (and associated users) in the two partitions to maximize the aggregate system throughput while ensuring proportional fairness. Efficient yet simple solutions are devised for each of these components under the PUSC and AMC models and approximation guarantees established with respect to each of these components. The embodiments provide approximate solutions with good worst-case performance guarantees and superior average-case performance. This is achieved even though the determination of the optimal spatial reuse+ diversity schedule across two hops in the presence of finite user buffers is an NP-hard problem for both PUSC and AMC models.

Description

FIG. 1A shows an exemplary block diagram representing a spatial reuse and diversity scheduler at a base station (BS). In this embodiment, the base station is part of a downlink OFDMA-based, relay-enabled, two-hop wireless network. A set of K mobile stations (MS) are uniformly located within an extended cell radius. A small set of R relay stations (RS) are added to the mid-way belt of the network. MS that are closer to the BS directly communicate with it. However, MS farther from the BS connect with the RS that is closest to them. The one-hop links between BS and RS are referred to as relay links, RS and MS as access links, and BS and MS as direct links. The BS, RS and MS are allowed to operate on multiple channels from a set of NT total OFDM sub-channels. Data flows are considered and assumed to originate in the Internet and destined towards the MS. All stations are assumed to be half-duplex. Hence, an RS can be active on only its relay or access link in any slot but not both. Let $P_B$, $P_R$ denote the maximum power used by the BS,RS for their transmission ($P_R \leqq P_B$), which is split equally across all sub-channels and no power adaptation across channels is assumed, given the marginal gains resulting from it.

Figure 1B:
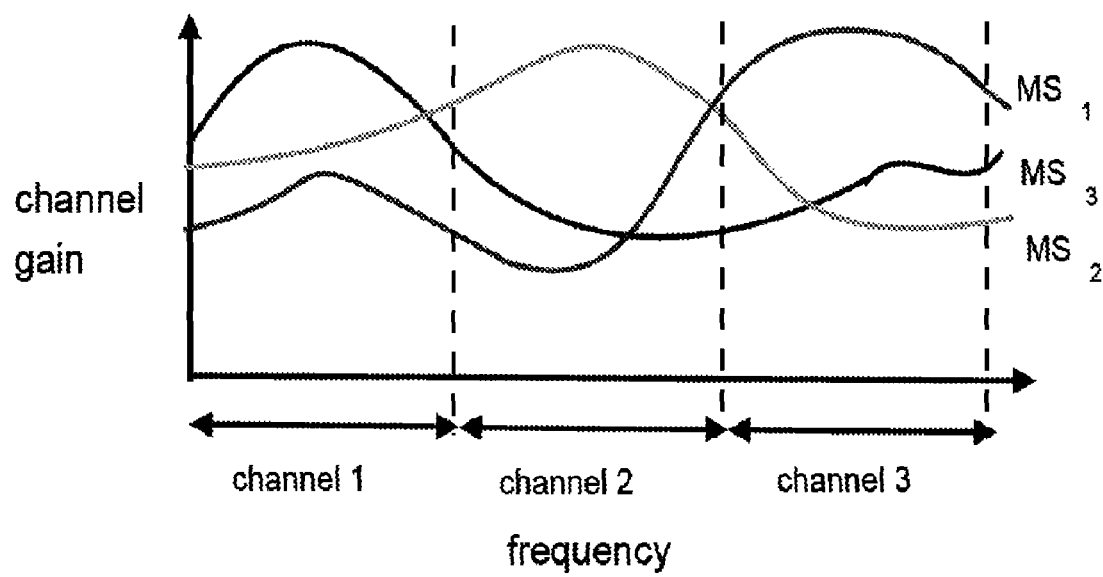

A sub-channel corresponds to a group of sub-carriers. There are two models defined in IEEE 802.16j for sub-carrier grouping, namely distributed and contiguous permutations. In distributed permutation, also referred to as partial usage of sub-carriers (PUSC), the sub-carriers constituting a sub-channel are chosen randomly from the entire frequency spectrum. In contiguous permutation, also referred to as band adaptive modulation and coding (AMC), adjacent sub-carriers are chosen. In PUSC, a single channel quality value (averaged over entire spectrum) is fed back by a RS/MS, which is common to all its sub-channels, thereby eliminating channel diversity and providing only MUD. The random choice of sub-carriers in a channel however helps average out interference. In AMC, the high correlation in channel gains across adjacent sub-carriers helps leverage channel diversity in addition to multi-user diversity through scheduling (eg. channels 3, 2 and 1 assigned to MS 1, 2 and 3 respectively in FIG. 1B). However, a RS/MS now has to feed back channel quality on all its sub-channels to BS.

While the addition of relays improves the individual links on the relay and access hops, the packets now take two hops to reach the MS. Spatial reuse forms the key in addressing this loss factor of half arising from multi-hop burden. With comparable values of $P_R$ and $P_B$, the spatial separation of RS allows relay (eg. BS-RS3 in FIG. 1A) and access (RS1-MS1) links to operate in tandem, spatially reusing the same set of channels across hops without causing mutual interference (interference from RS1 on RS3 and from BS on MS1 are weaker than the received signal strength from BS and RS3 respectively). Spatial reuse is possible with both PUSC and AMC. MS (RS) provide feedback on interference, i.e. received power from BS (other RS). This embodiment does not reuse channels within the access hop, since it does not lead to benefits unless the access hop becomes the network bottleneck, which is not common. Further, it comes at the cost of spatial reuse across hops, which is a more important feature to be leveraged.

In the two-hop relay-enabled wireless network, the relay stations (RS) are connected to the wireless infrastructure (base station, BS) and provide improved coverage and capacity to several applications including serving mobile users (MS) in business hot-spots, office buildings, transportation vehicles, coverage holes, among others. The two-hop network model coupled with OFDM provides two key benefits, namely diversity and spatial reuse gains. Two kinds of diversity gains can be exploited through scheduling: (i) multi-user diversity (MUD): for a given sub-channel, different users experience different fading statistics, allowing us to pick a user with a larger gain; and (ii) channel diversity: sub-channels experiencing high gain could vary from one user to another, allowing for multiple users to be assigned their best channels in tandem. In addition to the diversity gain, the two-hop network model also provides room for spatial reuse, whereby simultaneous transmissions on the relay hop (BS-RS) and access hop (RS-MS) can be leveraged on the same channel as long as there is no mutual interference. While diversity improves performance to a certain extent, spatial reuse is the key in delivering high throughputs in a multi-hop model, as detailed below.

Figure 1C:
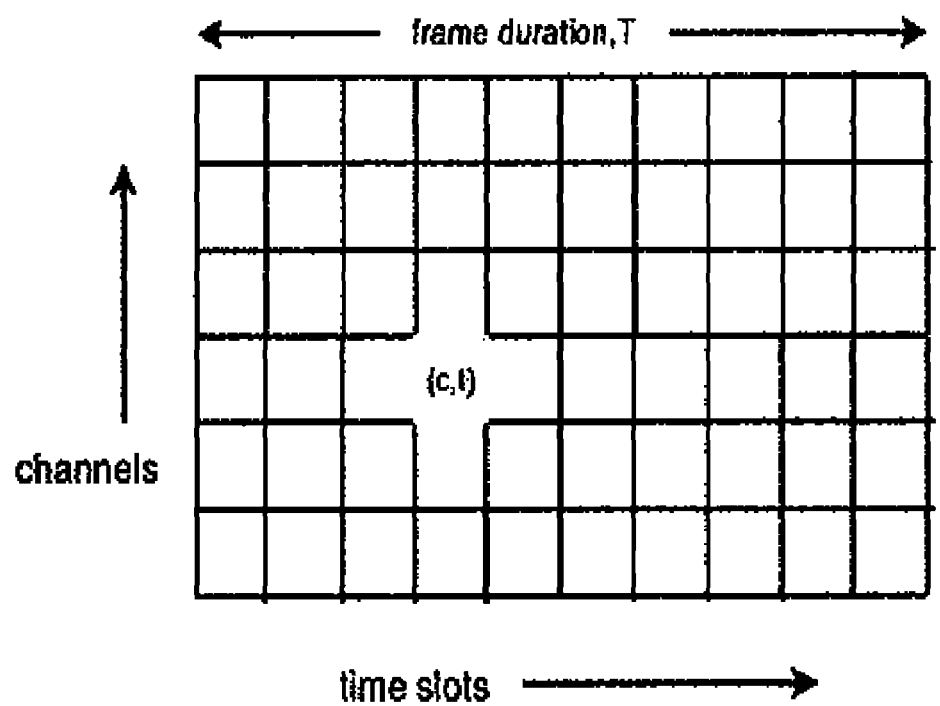

The system can be a synchronized, time-slotted system similar to a WiMAX relay, with BS and RS transmitting data in frames. Every frame consists of several time slots and has to be populated with user assignments across both time slots and channels (FIG. 1C). It is sufficient to consider the problem with one time slot per frame since channels in other time slots can be considered as additional channels available to the considered time slot. The RS assignments to relay channels and the MS assignments to access channels for the current frame are indicated to RS and MS through a MAP that follows the preamble in the frame (eg. 802.16j), which is transmitted at the lowest modulation and coding. In every slot of a frame, a set of RS and MS on the relay and access hops respectively are activated based on the assignments provided by the BS.

The scheduling processeso maximize the end-to-end system throughput subject to the popular proportional fairness model. The system converges to the optimum if the scheduler's decisions at each epoch (interval) are made to maximize the aggregate marginal (incremental) utility, $$S_{max} = \text{argmax}_S \left\{ \sum_{k \in S} \Delta U_k \right\}.$$

$\Delta U_k$ denotes the marginal flow (two-hop) utility received by user k in a feasible schedule S and is given by $$\frac{\beta_k r_k^{eff}}{\bar{r}_k}$$

for proportional fairness, where $\beta_k$ captures the priority weight of user's QoS class and $\bar{r}_k$ its average throughput. $r_k^{eff}$ corresponds to the user's two-hop flow rate, which in turn is determined by the instantaneous effective rate on the relay and access hops combined.

The system can work with the popular model in 802.16j standard, where the RS are assumed to be transparent. Here the RS pass the frame, received from BS on the relay hop, unchanged to the MS on the access hop. The MAP that carries the schedule information is not changed and hence a subchannel that gets assigned to a MS on the relay hop is retained on the access hop as well. Under this model, let $r_{k,n}^{rel}$ and $r_{k,n}^{acc}$ if be the bit-rates obtained for a user (flow) k on the relay (BS-R(k)) and access (R(k)-k) hops respectively on channel n, and $B_k$ be the available data in user k's buffer at the BS. R(k) is the relay to whom user k is associated. No per-user buffer is assumed at the simplistic RS. Then $$r_k^{eff} = \frac{1}{2} \cdot \min\left\{ \sum_{n \in A_k} \min\{r_{k,n}^{rel}, r_{k,n}^{acc}\}, \frac{B_k}{d} \right\},$$

where d is the frame duration and $A_k$ is the set of channels assigned to user k.

Figure 2:
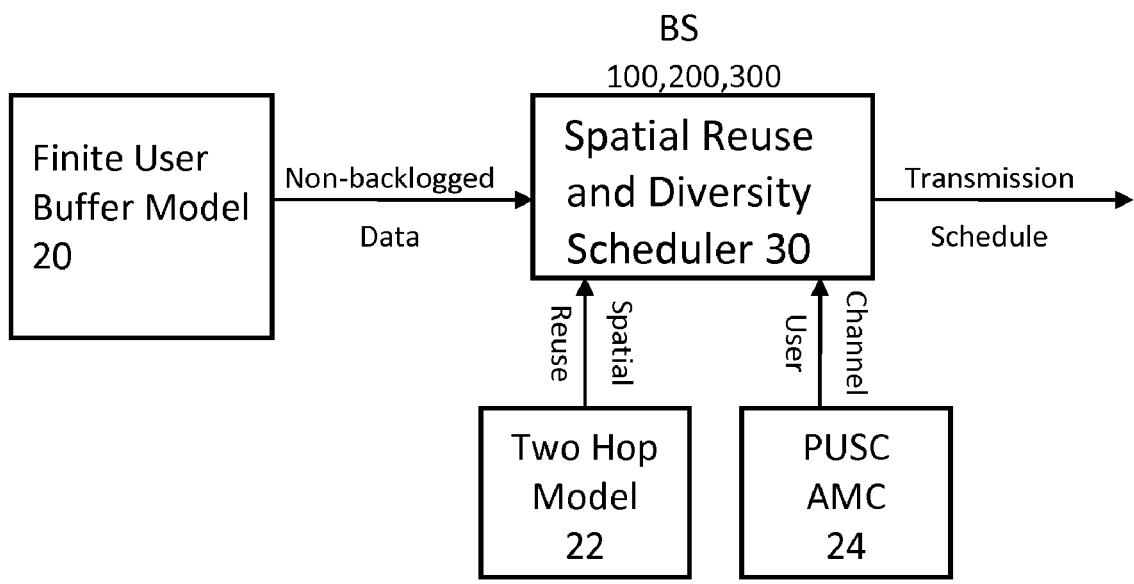
FIG. 2 shows an exemplary block diagram of a base station with spatial reuse and diversity scheduling operating under PUSC and AMC models, while incorporating finite data in user buffers.

FIG. 2 shows an exemplary base station of FIG. 1A. The base station has a scheduler 30 that incorporates spatial reuse and diversity gains. The scheduler 30 receives a finite user buffer model 20 and a two-hop wireless relay model 24 with spatial reuse (interference) information. The scheduler 30 also receives channel and user information from the PUSC and AMC model. The scheduler 30 generates a transmission schedule for both unicast and multicast data.

In one embodiment, the scheduler determines (i) how to allocate channels to RS and MS to leverage diversity, and (ii) how to spatially reuse the channels across relay and access hops, such that the aggregate marginal utility of all the MS (flows) is maximized. Since the RS are half-duplex, leveraging spatial reuse now requires that the set of RS be partitioned into two: one set comprising of RS operating on the relay hop, while the other operating on the access hop using the same set of channels during the frame. Hence, the equivalent spatial reuse and diversity scheduling (SDS) problem is: Given a set of RS and MS with active flows, find a partition of the RS (operating on relay and access hops) and an assignment of the channels to relay/user pairs (one from each partition operating on the same channel) such that aggregate marginal utility is maximized. The solution to the problem gives us a schedule that leverages diversity and spatial reuse gains. Since the flows occur over two hops, the resulting flow schedule is executed over two frames. The problem can be formulated as follows.

$$\text{Maximize} \sum_{c=1}^{N} \sum_{k_2: Y(k_2)=1} \sum_{k_2: Y(k_2)=0} w(k_1, k_2, c) X(k_1, k_2, c)$$

subject to $$Y(k_1) \oplus Y(k_2) = 1, \forall (k_1, k_2); R(k_1) = R(k_2)$$

$$\sum_{k_1} \sum_{k_2} X(k_1, k_2, c) \leq 1, \forall c$$

$$\sum_c \sum_{k_2: k_2 \neq k_2} w(k_1, k_2, c) X(k_1, k_2, c) \leq \frac{B_{k_1}}{\bar{r}_{k_2} d}, \forall k_1$$

$$Y(k_1), Y(k_2), X(k_1, k_2, c) \in \{0, 1\}; k_1, k_2 \in [1, K] \cup \emptyset$$

Y(k) indicates the assignment of MS k and its associated RS, R(k) to the relay set that will operate on the relay hop (Y(k)=1) or access hop (Y(k)=0). $X(k_1,k_2,c)$ indicates the assignment of channel c to $R(k_1)$ that will operate (receiving) on the relay hop in tandem with $R(k_2)$ that will operate (transmitting) on the access hop, while the weight $w(k_1,k_2,c)$ represents the net marginal utility that will result from the schedule of the two flows taking interference into account. The first constraint captures the half duplex nature of RS, assigning all MS associated with the same RS to belong to only one of the two partitions, represented by the xor operation. The second constraint captures channel feasibility in assigning a channel to atmost one user on a hop. The last constraint captures buffer feasibility for users ($\beta_k$=1 for simplicity). In leveraging spatial reuse, the interference between the relay and access links operating on the same channel is taken into account. The weight function can be simplified as follows.

$$w(k_1, k_2, c) = \frac{\min\{r_{k_1,c}^{rel}, r_{k_2,c}^{acc}\}}{2\bar{r}_{k_2}} + \frac{\min\{r_{k_2,c}^{rel}, r_{k_2,c}^{acc}\}}{2\bar{r}_{k_2}} r_{k_1,c}^{rel} = \quad (1)$$

$$\log\left(1 + \frac{S_{R(k_1),c}^{rel}}{I_{R(k_2),R(k_3),c} + n_c}\right); \text{ For SINR} \gg 1,$$

we have $r_{k_1,c}^{rel} \approx \log(S_{R(k_1),c}^{rel}) - \log(I_{R(k_1),R(k_2),c} + n_c) =$ -continued $$\hat{S}_{k_2,c}^{rel} - \hat{I}_{R(k_1),R(k_2),c} r_{k_2,c}^{acc} = \log\left(1 + \frac{s_{k_2,c}^{acc}}{1_{k_2,BS,c} + n_c}\right) = \hat{S}_{k_2,c}^{acc}$$

Hence, $w(k_1, k_2, c) = \frac{\hat{r}(k_1, k_2, c)}{2\bar{r}_{k_1}} + \frac{\hat{r}(k_2, k_2, c)}{2\bar{r}_{k_2}}$ where $\hat{r}(k_1, k_2, c) =$ $$\min\{\hat{S}_{k_2,c}^{rel} - \hat{I}_{R(k_2),R(k_2),c}\tilde{S}_{k_2,c}^{acc}\},$$

$$\hat{r}(k_2, k_1, c) = \min\{\hat{S}_{k_2,c}^{rel} - \hat{I}_{R(k_2),R(k_2),c}\tilde{S}_{k_2,c}^{acc}\}$$

where $S_{x,c}$ and $I_{x,y,c}$ indicate the received signal and interference power (from y) respectively at x on channel c. We assume an interference model with large scale fading, where if the distance (D) between $R(k_1)$ and $R(k_3)$ is greater than that between $R(k_1)$ and $R(k_2)$, then $\hat{I}_{R(k_3),R(k_3),c} \leq \hat{I}_{R(k_2),R(k_2),c}$. Further, by definition, $w(k_1, k_2, c) = w(k_2, k_1, c)$. Also, $$w(k_1, c) = \frac{\hat{r}(k_2, c)}{2\bar{r}_{k_1}},$$

corresponds to the case with no interference ($I_{R(k_2),R(k_2),c}=0$, $I_{k_2,BS,c}=0$) and hence no reuse on channel c.

Figure 3:
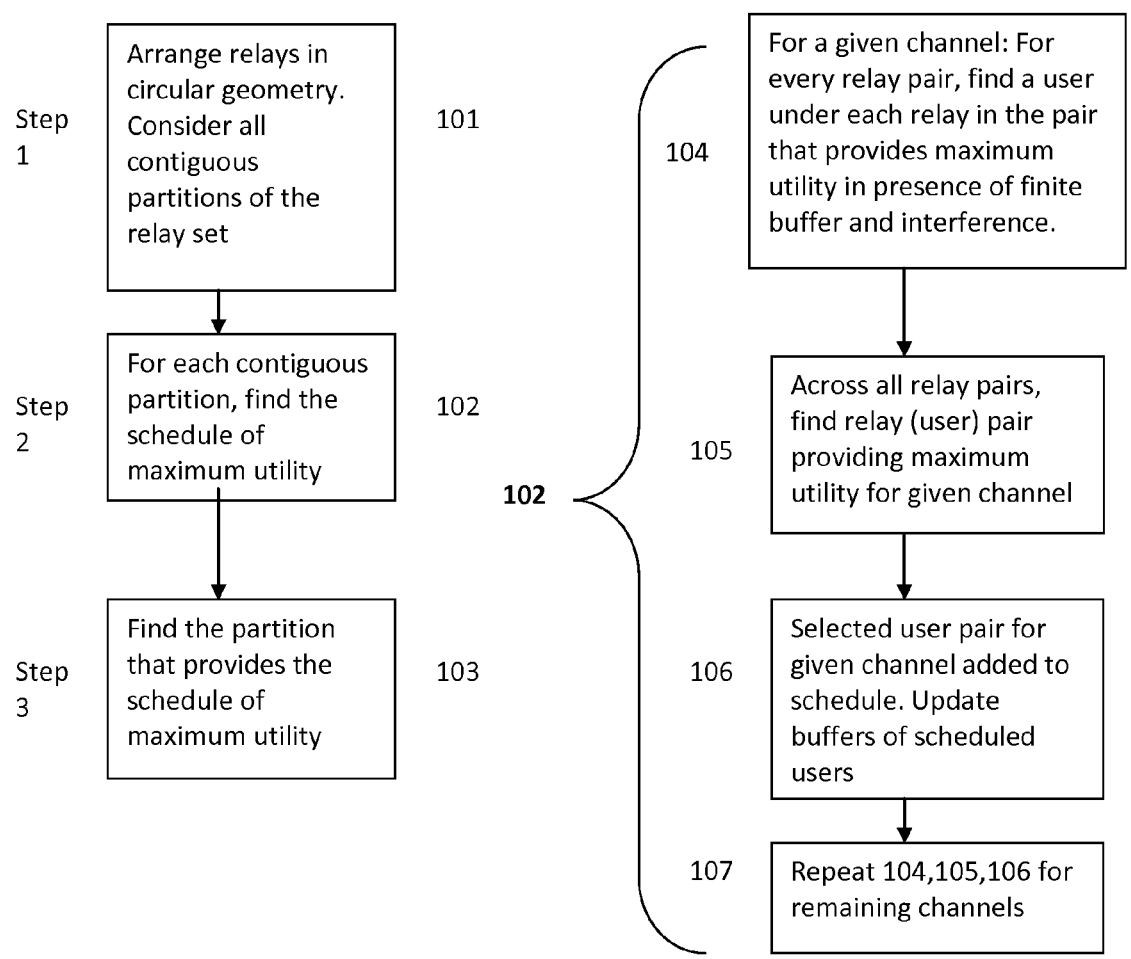
FIG. 3 shows an exemplary flow-chart describing the scheduling operations in the PUSC model with finite buffering.

FIG. 3 shows an exemplary flow-chart describing the scheduling operations in the PUSC model with finite buffering. In 101, the process arranges relays in circular geometry with consideration to all contiguous partitions of the relay set. In 102, for each contiguous partition the process determines a schedule of maximum utility. In 103, the process determines the partition that provides the schedule of maximum utility.

Operation 102 can be expanded to include operations 104-107. For a given channel: For every relay pair, find a user under each relay in the pair that provides maximum utility in presence of finite buffer and interference. In 104, across all relay pairs, the process finds relay (user) pair providing maximum utility for given channel. In one embodiment, for a given channel, c, for every relay pair, the process finds a user under each relay in the pair that provides maximum utility in presence of finite buffer and interference. This is accomplished in the following set of equations below.

for all $(R_1, R_2) : R_1 \in P_l \cup \emptyset, R_2 \in P_r \cup \emptyset$
do $$k_{R_1} = \arg\max_{k_1 \in R_1} \left\{\frac{\min\{\hat{r}(k_1, R_2, c), Q_{k_1}\}}{2\bar{r}_{k_1}}\right\}$$

$$k_{R_2} = \arg\max_{k_2 \in R_2} \left\{\frac{\min\{\hat{r}(k_2, R_1, c), Q_{k_2}\}}{2\bar{r}_{k_2}}\right\}$$

end for where R and k denotes relay and user respectively; $\hat{r}(k_1, R_2, c)$ denotes instantaneous rate for user k1 in both relay and access hops combined when operating on channel c and receiving interference from relay R2 which also operates on the same channel; $\bar{r}_k$ denotes the average throughput received by user k thus far; $Q_k$ denotes the data left in user k's buffer.

In 105, the process selects a user pair for given channel added to schedule and then updates buffers of scheduled users in 106. In 105, across all relay pairs, the determination of the relay (user) pair providing maximum utility for given channel can be done with the equation below, where the best user pair is chosen.

$$(k_1^*, k_2^*) = \arg\max_{(R_1,R_2): R_1 \in P_l \cup \emptyset, R_2 \in P_r \cup \emptyset}$$

$$\left\{\frac{\min\{\hat{r}(k_{R_1}, k_{R_2}, c), Q_{k_{R_1}}\}}{2\bar{r}_{k_{R_1}}} + \frac{\min\{\hat{r}(k_{R_2}, k_{R_1}, c), Q_{k_{R_2}}\}}{2\bar{r}_{k_{R_2}}}\right\}$$

where Pl and Pr are the L and R partitions respectively considered in the flow chart.

In 106, the selected user pair for the given channel is added to schedule 'S' and the buffers of scheduled users are updated. This is accomplished using the equations:

$$S \leftarrow S \cup (k_1^*, k_2^*, c)$$

$$Q_{k_1}^* = Q_{k_1}^* - \min\{\hat{r}(k_1^*, k_2^*, c), Q_{k_1}^*\}$$

$$Q_{k_2}^* = Q_{k_2}^* - \min\{\hat{r}(k_2^*, k_1^*, c), Q_{k_2}^*\}$$

In 107, the process repeats operations 104,105,106 for each of the remaining channels, thereby coming up with a schedule for all the channels that leverages spatial reuse across the two partitions formed.

Figure 4:
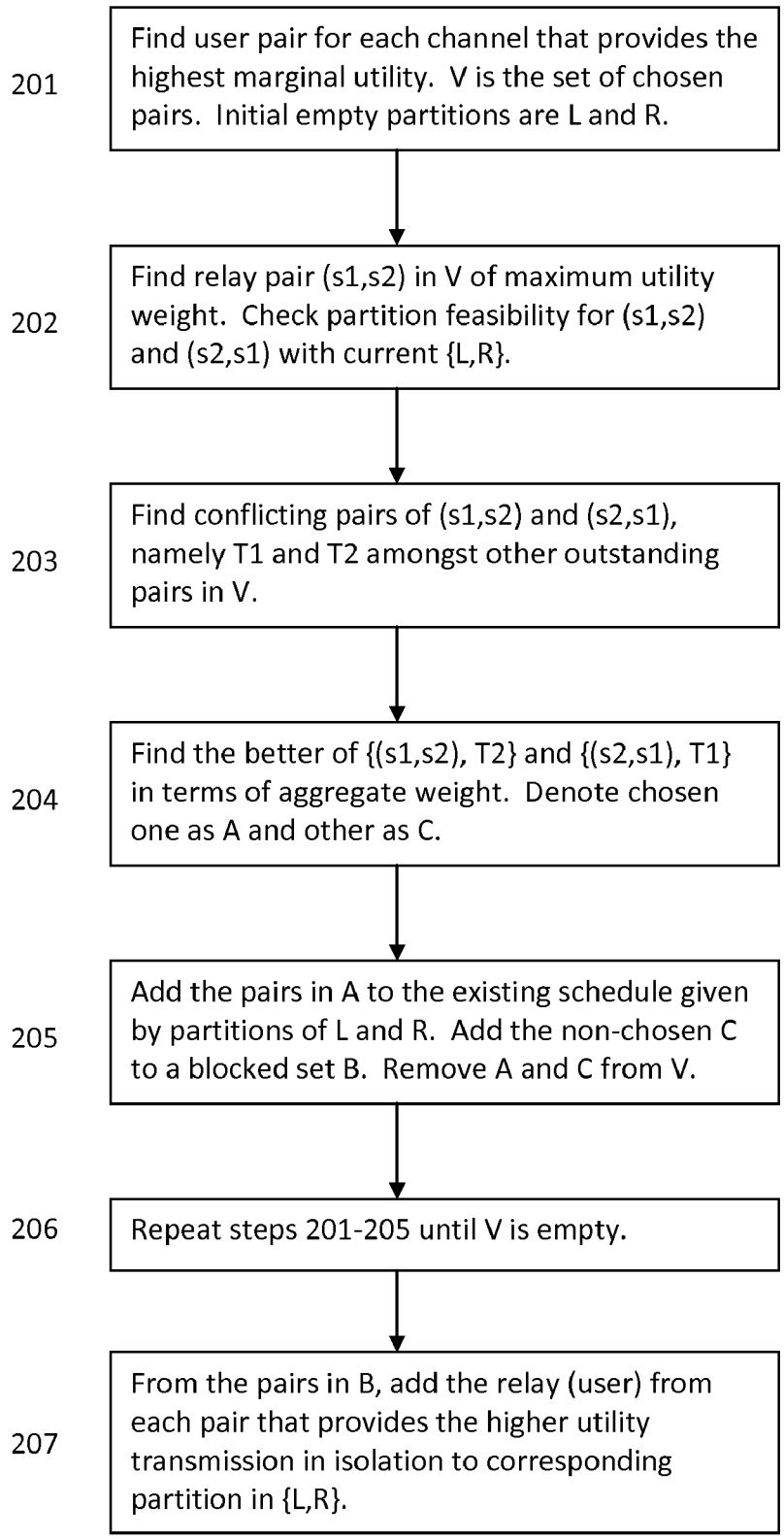
FIG. 4 shows an exemplary flow-chart describing the scheduling operations in the AMC model with backlogged buffering.

FIG. 4 shows an exemplary flow-chart describing the scheduling operations in the AMC model with backlogged buffering. In 201, the process determines a user pair for each channel that provides the highest marginal utility. V is the set of chosen pairs. Initial empty partitions are L and R. In one embodiment, this is accomplished for each channel 'c' as follows:

$$(k_1^c, k_2^c) = \arg\max_{k_1, k_2 : R(k_1) \neq R(k_2)}\{\omega(k_1, k_2, c)\}$$

The process map the user pair to corresponding relay pairs and store their respective weights as follows:

$$(R_1^c, R_2^c) = (R(k_1^c), R(k_2^c))\omega(c) = \omega(k_1^c, k_2^c, c)$$

V is the set of chosen pairs. Initial empty partitions are L and R.

$$V \leftarrow \{(R_1^c, R_2^c, c)\}, \forall c$$

In 202, the process finds a relay pair (s1,s2) in V of maximum utility weight and checks a partition feasibility for (s1, s2) and (s2,s1) with current {L,R}. In one embodiment, the system finds the relay pair $(R_1^{c*}, R_2^{c*})$ in V of maximum utility weight. Check partition feasibility for $(R_1^{c*}, R_2^{c*})$ and $(R_2^{c*}, R_1^{c*})$ with current {L,R}. This is accomplished in the equation below.

Choose $(R_1^{c*}, R_2^{c*}, c^*) = \arg\max_{(R_1c,R_2c)\in V}\{w_c\}$
if $\{\{R_1^{c*} \notin \mathcal{R}\}\&\{R_2^{c*} \notin \mathcal{L}\}\}$ then
$\quad a_1 = (R_1^{c*}, R_2^{c*}, c^*)$
if $\{\{R_2^{c*} \notin \mathcal{R}\}\&\{R_1^{c*} \notin \mathcal{L}\}\}$ then
$\quad a_2 = (R_2^{c*}, R_1^{c*}, c^*)$ In 203, the process determines conflicting pairs of (s1,s2) and (s2,s1), namely T1 and T2, amongst other outstanding pairs in V. In one embodiment, the system finds conflicting pairs of $(R_1^{c*}, R_2^{c*})$ and $(R_2^{c*}, R_1^{c*})$, namely T1 and T2 amongst other outstanding pairs in V. The set of conflicting pairs for a given pair is obtained using the following equations by using the given pair as input.

```
for all (R_1^ĉ, R_2^ĉ, ĉ) ∈ V : (R_1^ĉ, R_2^ĉ) ≠ (R_1^c*, R_2^c*) do
    if {R_1^ĉ & R_2^ĉ} ∈ {(𝓛 ∪ {R_1^c*}) || (𝓡 ∪ {R_2^c*})} then
        w_I = w_I + w(R_1^ĉ, R_2^ĉ, ĉ)
        𝒯 ← 𝒯 ∪ {(R_1^ĉ, R_2^ĉ)}
    end if
end for
```

In 204, the process determines a better fit among {(s1,s2), T2} and {(s2,s1), T1} in terms of aggregate weight. The process denotes one of the set as A and other as C. In one embodiment, the process finds the better of $(R_1^{c*}, R_2^{c*}) \cup T_2$ and $(R_2^{c*}, R_1^{c*}) \cup T_1$ in terms of aggregate weight. Denote chosen one as Ta and other as Tb. This is accomplished using the equations below.

```
if (w(a_1) + (w_{I_2}) ≥ (w(a_2) + w_{I_1}) then
    (R_1^c', R_2^c', c') = a_1; 𝒯_a = 𝒯_2; 𝒯_b = 𝒯_1
else
    (R_1^c', R_2^c', c') = a_2; 𝒯_a = 𝒯_1; 𝒯_b = 𝒯_2
end if
```

In 205, the process adds the pairs in A to the existing schedule given by partitions of L and R. The process also adds the non-chosen C to a blocked set B and removes A and C from V. In one embodiment, the process adds the pairs in Ta along with the partition under consideration to the existing schedule, given by partitions of L and R. Add the eliminated pairs Tb to a blocked set B. Remove the considered pair, Ta and Tb from V. This is accomplished in the following equations.

$\mathcal{L} \leftarrow \mathcal{L} \cup \{R_1^{c1}\} \cup_{\hat{c} \in \mathcal{T}_a} R_1^{\hat{c}}\}$ $\mathcal{R} \leftarrow \mathcal{R} \cup \{R_2^{c1}\} \cup_{\hat{c} \in \mathcal{T}_a} R_2^{\hat{c}}\}$ $\mathcal{B} \leftarrow \mathcal{B} \cup_{\hat{c} \in \mathcal{T}_b} \{(R_1^{\hat{c}}, R_2^{\hat{c}}, \hat{c})\}$ $V \leftarrow V \setminus \{(R_1^{c1}, R_2^{c1}, c^1) \cup_{\hat{c} \in \mathcal{T}_a} \{(R_1^{\hat{c}}, R_2^{\hat{c}}, \hat{c})\} \cup_{\hat{c} \in \mathcal{T}_b} \{(R_1^{\hat{c}}, R_2^{\hat{c}}, \hat{c})\}$ In 206, the process repeats operations 201-205 until V is empty.

In 207, from the pairs in B, the process adds the relay (user) from each pair that provides the higher utility transmission in isolation to corresponding partition in {L,R}. From the pairs in B, add the relay (user) from each pair that provides the higher utility transmission in isolation to corresponding partition in {L,R}. Finally, {L,R} provides the desired schedule. The pseudo-code for this embodiment is as follows:

```
for all (R_1^ĉ, R_2^ĉ, ĉ) ∈ B do
    if w(R_1^ĉ, ĉ) ≥ w(R_2^ĉ, ĉ) then
        Add R_1^ĉ to the partition (𝓛 or 𝓡) that already contains
            R_1^c', c' ≠ ĉ.
    else
        Add R_2^ĉ to the partition (𝓛 or 𝓡) that already contains
            R_1^c', c' ≠ ĉ.
    end if
end for
```

Figure 5:
FIG. 5 shows an exemplary flow-chart describing the scheduling operations in the AMC model with finite buffering.

FIG. 5 shows an exemplary flow-chart to process the AMC model with finite buffering. In 301, for a given channel, the process finds a user pair that provides maximum utility in presence of finite buffer and interference. The process updates the buffer of users in chosen pair and this operation is repeated for remaining channels. In one embodiment, this is accomplished in the following equations:

```
for c = 1 to N do
    (k_1^c, k_2^c, c) = arg max_{(k_1,k_2):R(k_1)≠R(k_2);k_1,k_2∈[1,K]∪0}
        { min{r̂(k_1, k_2, c), Q_{k_1}} / 2r̄_{k_1}  +  min{r̂(k_2, k_1, c), Q_{k_2}} / 2r̄_{k_2} }

Q_{k_1c} = Q_{k_1c} - min{r̂(k_1^c, k_2^c, c), Q_{k_1c}}
    Q_{k_2c} = Q_{k_2c} - min{r̂(k_2^c, k_1^c, c), Q_{k_2c}}
    (R_1^c, R_2^c) = (R(k_1^c), R(k_2^c))
    w(c) = w(k_1^c, k_2^c, c)
end for
```

Next, in 302, given the set of chosen user pairs for all channels as V, the process of FIG. 5 runs the process of FIG. 4 to process the AMC model with backlogged buffering. After operation 302 is done to restore partition feasibility, the process generates a feasible transmission schedule.

Next, factors involved in scheduling under PUSC are discussed. Under the PUSC model, the sub-carriers constituting a channel are picked randomly and a user sends only one channel quality value that is common to all his sub-channels. This makes the problem simpler than the case where different sub-channels have different values (AMC). However, even for this model, the problem is hard to solve (NP-hard) if the users have finite buffers; unlike the backlogged cases where the problem is optimally solvable. Given the hardness of the problem, one embodiment uses an approximation process $SDS_{PUSC(B)}$ with good running time complexity. The process consists of two components: (i) it considers only contiguous partitioning of the relay stations; and (ii) given a feasible contiguous partition, it uses a greedy algorithm in choosing a pair of users from the two partitions who will maximize the aggregate marginal utility of the two flows combined for a given channel, subject to interference and their finite buffer size.

In PUSC, the interference and instantaneous rate depend only on the interfering relay station and not on the specific channel being used. Thus, every relay can determine its best user for a channel (subject to buffer constraint), independent of the other user operating on the channel as long as the other interfering relay station is known. Thus, scheduling decisions can be made only with respect to relays $(R_1, R_2)$ by choosing the relay pair with highest marginal utility; and the users already selected within the chosen relays provide the users to be scheduled for the channel. After the scheduling decision is made on each channel, the buffer size for each scheduled user is updated. Finally, the contiguous partition providing the maximum aggregate marginal utility is selected to be the schedule. Pseudo-code for the PUSC scheduler with finite user buffering is as follows:

```
1:  𝒫 ← { }  % set of partitions considered
2:  for i = to 0 to R - 1 do
3:      for j = 1 to R do
4:          P ← Two contiguous partitions formed by two lines
```

-continued

```
            drawn at i and j in a circular arrangement of relays.
 5:         P = {P_l|P_r}
 6:         if P ∉ 𝒫 then
 7:             𝒫 ← 𝒫 ∪ P
 8:             S_P ← { } % Schedule with partition P
 9:             Q_k ← B_k % initialize user buffers
10:             % For given partition P, determine user pair assignments
                to channels
11:             for c = 1 to N do
12:                 for all (R_1, R_2) : R_1 ∈ P_l ∪ ∅, R_2 ∈ P_r ∪ ∅
                    do
```

13:
$$k_{R_1} = \arg\max_{k_1 \in R_1} \left\{ \frac{\min\{\hat{r}(k_1, R_2, c), Q_{k_1}\}}{2\bar{r}_{k_1}} \right\}$$

14:
$$k_{R_2} = \arg\max_{k_2 \in R_2} \left\{ \frac{\min\{\hat{r}(k_2, R_1, c), Q_{k_2}\}}{2\bar{r}_{k_2}} \right\}$$

```
15:             end for
16:             (k_1*, k_2*) = arg max_(R_1,R_2):R_1∈P_l∪∅,R_2∈P_r∪∅
```

17:
$$\left\{ \frac{\min\{\hat{r}(k_{R_1}, k_{R_2}, c), Q_{k_{R_1}}\}}{2\bar{r}_{k_{R_1}}} + \frac{\min\{\hat{r}(k_{R_2}, k_{R_1}, c), Q_{k_{R_2}}\}}{2\bar{r}_{k_{R_2}}} \right\}$$

```
18:             Q_{k_1*} = Q_{k_1*} − min{r̂(k_1*, k_2*, c), Q_{k_1*}}
19:             Q_{k_2*} = Q_{k_2*} − min{r̂(k_2*, k_1*, c), Q_{k_2*}}
20:             S ← S ∪ (k_1*, k_2*, c)
21:             end for
22:             if |S_P| > |S_max| then
23:                 S_max ← S_P
24:                 P_max ← P
25:             end if
26:         end if
27:     end for
28: end for
29: Output P_max and S_max
```

PUSC Scheduler for Finite User Buffer: $SDS_{PUSC(B)}$

While the simplicity of the algorithm is conducive for real-time implementation at BS, establishing its approximation guarantee is non-trivial. Here, the loss in performance can be bounded due to the two components, namely (i) contiguous partitioning and, (ii) greedy scheduling.

In the embodiment with Contiguous Partitioning, the placement of relays around BS induces a circular ordering in them and a feasible schedule under PUSC can be represented as a bipartite graph. The two partitions of relays forming the two vertex sets, with an edge between a pair of relays indicates that both the relays operate on the same channel (c). In PUSC the edges are important and not the specific channels that are assigned to them. Also, an edge could be assigned multiple channels. In bounding the performance loss, a construction from a non-contiguous partition to a contiguous partition. A non-contiguous partition can be converted to a contiguous partition losing atmost one transmission from the schedule. Further, the lost transmission can be made the weakest transmission from the weakest edge of the bipartite schedule graph. The updated set of edges in the contiguous partition after the transformation have equivalent or weaker interference. Under PUSC, any non-contiguous partition can be converted to a contiguous partition with a performance within 5/6 that of the optimal.

In the embodiment with Greedy Scheduling, the sub-optimality of greedy scheduling can be bounded within 1/2 that of the optimal. The greedy scheduler tries to find an assignment of a pair of users from the two partitions for each channel such that the aggregate marginal utility is maximized, thereby maximizing a sub-modular function. The greedy scheduling part of $SDS_{PUSC}$ provides an approximation guarantee of 1/2. $SDS_{PUSC(B)}$ is a 5/12-approx with respect to the optimal solution. It has a running time complexity of $O(R^3KN)$ Next, factors involved in scheduling under the AMC model are discussed. Under the band AMC model, since contiguous carriers constitute a sub-channel, there exists a notion of channel quality specific to a sub-channel. This allows exploitation of channel diversity in addition to MUD. However, it also makes the problem harder compared to PUSC model, since channel index forms an additional decision parameter. The SDS problem is NP-hard under the AMC model, even with backlogged user buffers. Given the hardness of the problem, a simple greedy process, $SDS_{AMC}$ can be used with an efficient approximation guarantee. The $SDS_{AMC}$ first identifies the user pair that delivers the highest aggregate marginal utility for each channel. However, the corresponding set of relay pairs chosen (V) might not result in a feasible partitioning of relays, causing partition violations. Partition feasibility is then restored amongst the relay pairs using a greedy algorithm. Sets $\mathcal{L}$ and $\mathcal{R}$ eventually store a feasible partition of the set of relays along with their channel assignment. The chosen pairs are added to the partitions in the decreasing order of their weights, while satisfying partition feasibility. Given a feasible set of partitioned pairs at an intermediate step, the addition of a new pair is decided as follows. The pair with the largest utility weight, say $(s_1,s_2)$ on channel $c^*$ is considered. Since $w(s_1,s_2,c^*)=w(s_2,s_1,c^*)$, both $(s_1,s_2)$ and its inverted version $(s_2,s_1)$ are first checked for feasibility to see if they can be added to the current partitions without causing any partition conflicts. The outstanding pairs that will be eliminated due to the addition of this pair and its inverted version to the existing partitions are determined as $\mathcal{T}_1$ and $\mathcal{T}_2$ respectively. A pair is eliminated if both its elements belong to the same partition. Note that the conflicting pairs of $(s_1, s_2)$ in $\mathcal{T}_1$ can be scheduled along with $(s_2, s_1)$ and vice versa. If the considered pair and the conflicting pairs of $\mathcal{T}_2$ together provide a higher weight than the inverted pair and the conflicting pairs of $\mathcal{T}_1$, then $(s_1, s_2) \cup \mathcal{T}_2$ is chosen for schedule by adding them to the appropriate partitions. Otherwise, $(s_2, s_1) \cup \mathcal{T}_1$ is chosen for schedule. When $(s_1, s_2) \cup \mathcal{T}_2$ is chosen, the pairs conflicting with the chosen set, namely $\mathcal{T}_1$ are removed from V by adding them to a blocked set $\mathcal{B}$ and vice versa. The set of remaining pairs, V is updated by removing the set of scheduled and blocked pairs from it. After all elements in V have been appropriately assigned to partitions, the blocked set containing pairs conflicting with $\{\mathcal{L}, \mathcal{R}\}$ is examined. The stronger (higher weight) relay in each of the blocked pairs is alone retained and added to the appropriate partition ($\mathcal{L}$ or $\mathcal{R}$) already containing it, which can be done without any partition violations. The relays in $\mathcal{L}$ and $\mathcal{R}$ on specific channels are then mapped back to their respective users initially chosen.

---

1: for all $c \in [1, N]$ do
2:     $(k_1^c, k_2^c) = \arg\max_{k_1, k_2 : R(k_1) \neq R(k_2)} \{w(k_1, k_2, c)\}$
3:     $(R_1^c, R_2^c) = (R(k_1^c), R(k_2^c))$ % Store the user-relay mapping
4:     $w(c) = w(k_1^c, k_2^c, c)$
5: end for
6: Let $V \leftarrow \{(R_1^c, R_2^c, c)\}, \forall c$ be set of chosen relay pair elements.
7: % Generate a feasible partition from chosen pairs.
8: Initialize $\mathcal{L} = \{\}, \mathcal{R} = \{\}, \mathcal{B} = \{\}$
9: Arrange the N vertices of V in decreasing order of $w_c$.
10: while $V \neq \emptyset$ do
11:     $\mathcal{T} = \mathcal{T}_1 = \mathcal{T}_2 = \mathcal{T}_a = \mathcal{T}_b = \{\}, w_I = w_{I_1} = w_{I_2} = 0,$
       $a_1 = a_2 = \{\}$
12:     Choose $(R_1^{c*}, R_2^{c*}, c*) = \arg\max_{(R_1^c, R_2^c, c) \in V} \{w_c\}$
13:     if $\{\{R_1^{c*} \notin \mathcal{R}\} \& \{R_2^{c*} \notin \mathcal{L}\}\}$ then
14:        $a_1 = (R_1^{c*}, R_2^{c*}, c*)$
15:     if $\{\{R_2^{c*} \notin \mathcal{R}\} \& \{R_1^{c*} \notin \mathcal{L}\}\}$ then
16:        $a_2 = (R_2^{c*}, R_1^{c*}, c*)$
17:     $\{\mathcal{T}_1, w_{I_1}\} = \text{Get\_Conflicts}(R_1^{c*}, R_2^{c*}, c*)$
18:     $\{\mathcal{T}_2, w_{I_2}\} = \text{Get\_Conflicts}(R_2^{c*}, R_1^{c*}, c*)$
19:     if $(w(a_1) + w_{I_2}) \geq (w(a_2) + w_{I_1})$ then
20:        $(R_1^{c'}, R_2^{c'}, c') = a_1; \mathcal{T}_a = \mathcal{T}_2; \mathcal{T}_b = \mathcal{T}_1$
21:     else
22:        $(R_1^{c'}, R_2^{c'}, c') = a_2; \mathcal{T}_a = \mathcal{T}_1; \mathcal{T}_b = \mathcal{T}_2$
23:     end if
24:     $\mathcal{L} \leftarrow \mathcal{L} \cup \{R_1^{c'} \cup_{\hat{c} \in \mathcal{T}_a} R_1^{\hat{c}}\}$
25:     $\mathcal{R} \leftarrow \mathcal{R} \cup \{R_2^{c'} \cup_{\hat{c} \in \mathcal{T}_a} R_2^{\hat{c}}\}$
26:     $\mathcal{B} \leftarrow \mathcal{B} \cup_{\hat{c} \in \mathcal{T}_b} \{(R_1^{\hat{c}}, R_2^{\hat{c}}, \hat{c})\}$
27:     $V \leftarrow V \setminus \{(R_1^{c'}, R_2^{c'}, c') \cup_{\hat{c} \in \mathcal{T}_a} \{(R_1^{\hat{c}}, R_2^{\hat{c}}, \hat{c})\} \cup_{\hat{c} \in \mathcal{T}_b} \{(R_1^{\hat{c}}, R_2^{\hat{c}}, \hat{c})\}\}$
28: end while
29: % Restore stronger transmissions from eliminated pairs
30: for all $(R_1^{\hat{c}}, R_2^{\hat{c}}, \hat{c}) \in \mathcal{B}$ do
31:     if $w(R_1^{\hat{c}}, \hat{c}) \geq w(R_2^{\hat{c}}, \hat{c})$ then
32:        Add $R_1^{\hat{c}}$ to the partition ($\mathcal{L}$ or $\mathcal{R}$) that already contains $R_1^{c'}, c' \neq \hat{c}$.
33:     else
34:        Add $R_2^{\hat{c}}$ to the partition ($\mathcal{L}$ or $\mathcal{R}$) that already contains $R_1^{c'}, c' \neq \hat{c}$.
35:     end if
36: end for
37: Output $\{\mathcal{L}, \mathcal{R}\}$.
38:
39: Get_Conflicts$(R_1^{\hat{c}}, R_2^{\hat{c}}, \hat{c})$
40: for all $(R_1^{\hat{c}}, R_2^{\hat{c}}, \hat{c}) \in V : (R_1^{\hat{c}}, R_2^{\hat{c}}) \neq (R_1^{c*}, R_2^{c*})$ do
41:     if $\{R_1^{\hat{c}} \& R_2^{\hat{c}}\} \in \{(\mathcal{L} \cup \{R_1^{c*}\}) \| (\mathcal{R} \cup \{R_2^{c*}\})\}$ then
42:        $w_I = w_I + w(R_1^{\hat{c}}, R_2^{\hat{c}}, \hat{c})$
43:        $\mathcal{T} \leftarrow \mathcal{T} \cup \{(R_1^{\hat{c}}, R_2^{\hat{c}})\}$
44:     end if
45: end for

---

AMC Scheduler for Finite User Buffer: $SDS_{AMC(A)}$ $SDS_{AMC}$ is a ¾-approximation algorithm to the SDS problem under AMC with backlogged buffers. It has a time complexity of $O(N(N+K^2))$. The initial selection of relay pairs for each channel runs in $O(K^2 N)$. The greedy algorithm to restore partition feasibility runs in $O(N^2)$, resulting in a net time complexity of $O(N(N+K^2))$.

Next, factors involved in scheduling under the AMC model with Finite User Buffers are discussed. Given that the backlogged buffer version is hard, the finite buffer version is strongly NP-hard. Hence, one embodiment uses an approximation solution, $SDS_{AMC(B)}$.

---

1: $\forall k \in [1, K], Q_k \leftarrow B_k$ % initialize user buffers
2: for $c = 1$ to $N$ do
3:     $(k_1^c, k_2^c, c) = \arg\max_{(k_1, k_2): R(k_1) \neq R(k_2); k_1, k_2 \in [1, K] \cup 0}$
4:     $\left\{ \dfrac{\min\{\hat{r}(k_1, k_2, c), Q_{k_1}\}}{2\bar{r}_{k_1}} + \dfrac{\min\{\hat{r}(k_2, k_1, c), Q_{k_2}\}}{2\bar{r}_{k_2}} \right\}$
5:     $Q_{k_1 c} = Q_{k_1 c} - \min\{\hat{r}(k_1^c, k_2^c, c), Q_{k_1 c}\}$
6:     $Q_{k_2 c} = Q_{k_2 c} - \min\{\hat{r}(k_2^c, k_1^c, c), Q_{k_2 c}\}$
7:     $(R_1^c, R_2^c) = (R(k_1^c), R(k_2^c))$
8:     $w(c) = w(k_1^c, k_2^c, c)$
9: end for
10: Run the greedy algorithm from $SRS_{AMC}$ for restoring feasible partitions.
11: Output $\{\mathcal{L}, \mathcal{R}\}$.

---

AMC Scheduler for Finite User Buffer: $SDS_{AMC(B)}$ $SDS_{AMC(B)}$ provides an approximation guarantee of ⅜ with a time complexity of $O(N(N+R^2))$. The performance guarantee of the channel assignment part due to the greedy approach is once again ½. Further, after the greedy channel assignment, the greedy solution to restore partitioning feasibility ensures ¾ of the value carried over from the assignment phase, resulting in a net guarantee of ⅜. Also, the time complexity of $SDS_{AMC(B)}$ is the larger of the two components ($SDS_{AMC}$), namely $O(N(N+K^2))$. Extensions of PUSC and AMC solutions to incorporate relay cooperation with performance guarantees are also contemplated by the inventors.

Performance Evaluation

An event-driven packet level simulator written in C++, named QNS, is used for evaluation of the various embodiments. A single cell relay-enabled OFDMA downlink system is modeled. The extended radius of the cell is assumed to be 600 m. RS are distributed uniformly within a region of 250 m ≤ r ≤ 350 m, with $$\frac{P_R}{P_B} = 0.75.$$

The wireless links incorporate path loss (exponent=4) and Rayleigh fading as well as interference from other links operating on the same channel. Each user's Rayleigh channel has a Doppler fading equivalent to a velocity of 3-10 Km/hour. We consider constant bit rate (CBR) applications as the generators of traffic. A time slot is considered to be of 5 ms duration, and carrier frequency is assumed to be 2 GHz. The peak rate of the individual sub-channels is 250 Kbps. The number of users, relays, sub-channels and buffer sizes are the parameters of variation. The data flows are sent at 125 Kbps. The metrics of evaluation are average user throughput and aggregate system utility. The simulated tests show that, for a given network capacity, when the number of users (channels) is small (large), the injected traffic load can be sustained using diversity gains alone. However, when the number of users (channels) increases (decreases), spatial reuse must be exploited to sustain a larger fraction of the injected traffic load. This in turn results in the throughput gain of spatial reuse increasing to 50% over diversity. The gain then stabilizes with increasing load once the available spatial reuse has been exploited. The utility results clearly indicate the need for spatial reuse in improving both throughput and fairness in the system. In addition to the significant gains over DIV, $SDS_{AMC}$ also performs reasonably close to the (loose) upper bound with a maximum deviation of about 20%. This is especially noteworthy, given that the optimal is going to be lower than the upper bound. Further, it also indicates that the additional gain that can result from a further degree of spatial reuse exploitation within access links is not appreciable and hence reuse across hops is the key.

The PUSC and AMC embodiments were also evaluated as a function of relays, sub-channels and users. When not varied, the number of relays is fixed at five, sub-channels at eight and users at thirty. For PUSC, the buffer sizes of users are uniformly distributed between [0,1000] bits. Three schemes are considered: $SDS_{PUSC(B)}$ is the proposed scheme. $UB_{PUSC}$ is a scheme that provides a loose (possibly unachievable) upper bound by considering backlogged user buffers. $D_{PUSC}$ is a (default) variant that computes a schedule assuming backlogged user buffers but executes it in the presence of finite user buffers. This scheme helps capture the degradation in performance when finite user buffers are not accounted for in scheduling $SDS_{PUSC(B)}$ provides a performance better than the guarantee of $5/12$ even with respect to the loose upper bound. While the absolute performance gap increases with increasing channels, the approximation ratio itself does not increase and the performance gap narrows with increasing users. This is because, when the number of user is less than the number of channels, the performance is dependent on how efficiently the available buffer data are used. However, when there are more users than channels, the performance is dependent on the availability of channels, reducing the burden on efficient buffer usage. This in turn results in closer performance to the upper bound when users outnumber the channels. Further, $D_{PUSC}$ suffers in performance, indicating that finite user buffers should be accounted for when making scheduling decisions. Also, since there is no channel diversity in PUSC, this makes the entire performance closely tied to how well the user buffers are utilized, especially when the number of users is small compared to channels.

In the case of AMC, this burden from user buffer utilization is shared by channel diversity. To isolate the impact of two components, we first consider backlogged buffers and evaluate $SDS_{AMC}$ against an optimal scheme, $OPT_{AMC}$. $OPT_{AMC}$ considers all possible relay set partitions in determining the best pair of relays to be assigned to each AMC sub-channel. $SDS_{AMC}$ performs very close to optimal under all network conditions—much better than its guarantee of $3/4$. Its ability to leverage channel diversity effectively is also evident with increasing channels where $SDS_{AMC}$ stays very close to $OPT_{AMC}$.

The impact of varying buffer sizes on the performance of $SDS_{PUSC(B)}$ and $SDS_{AMC(B)}$ is discussed next. When the finite buffer constraint is relaxed by increasing the user data availability, the performance of the solutions converges to the upper bound of their respective backlogged versions. The tests indicate that the finite buffer constraint is the single most performance-determining factor in PUSC, while it is both channel diversity and finite buffer constraints that determine performance in AMC and stringent buffer constraints can reduce performance.

In sum, the system provides efficient scheduling of user transmissions with backlogged and finite buffers on the multiple OFDM carriers (channels) over the two hops of the relay-enabled wireless network. The system supports the IEEE 802.16j and 802.16m standards and can work with the two sub-carrier grouping models (PUSC, AMC). While the extent of diversity gain varies depending on the model, spatial reuse is common to both the models and is crucial in delivering the promised throughput benefits of relays. The system leverages spatial reuse with diversity gains being leveraged when available. The embodiments are simple to implement at the base station, while also providing worst case guarantees. The proposed solutions are evaluated to highlight their benefits in a variety of network conditions. These solutions have also been extended with guarantees to incorporate relay cooperation. The system is simple to implement at the base station, thereby enabling their easy adoption.

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for scheduling transmissions in a relay-enabled two-hop wireless network, comprising:
    (i) partitioning a set of relays to enable spatial reuse while accounting for half-duplex nature of relays,
    (ii) assigning and reusing of channels across the relays (and associated users) in the two partitions to maximize the aggregate system throughput while ensuring proportional fairness; and grouping wireless sub-carriers to form one or more sub-channels, and one of a) said grouping comprising a distributed model while applying a 5/12 approximation and b) said grouping comprising a contiguous permutation model while applying a 3/4 approximation for a back-logged buffer or a 3/8 approximation for a finite buffer.

2. The method of claim 1, wherein alternatively the grouping comprises an Adaptive Modulation and Coding (AMC) model.

3. The method of claim 2, wherein the AMC model includes backlogged buffering, further comprising:
   a. determining a user pair for each channel that provides a highest marginal utility, where V is a set of chosen pairs and initial empty partitions include L and R;
   b. determining a mapping from the user pair chosen for each channel to corresponding relay pairs
   c. determining a relay pair (s1,s2) in V of maximum utility weight and checking a partition feasibility for (s1,s2) and (s2,s1) with current {L,R}
   d. determining conflicting pairs of (s1,s2) and (s2,s1) as T1 and T2 respectively;
   e. determining a better fit among {(s1,s2), T2} and {(s2,s1), T1} as A and the other as C;
   f. adding pairs in A to an existing schedule given by partitions of L and R and adding non-chosen pairs in C to a blocked set B and removing A and C from V;
   g. adding the relay (user) from each of the pairs in B that provides the higher utility transmission in isolation to its corresponding partition in {L,R}.

4. The method of claim 1, comprising communicating with IEEE 802.16j transceivers.

5. The method of claim 2, wherein the AMC model includes finite buffering, comprising:
   h. for a given channel, determining a user pair that provides maximum utility with finite buffer and interference;
   i. processing a scheduling method from the AMC model with backlogged buffering to restore partition feasibility; and
   j. generating a feasible transmission schedule.

6. A method for scheduling transmissions in a relay-enabled two-hop wireless network, comprising:
   partitioning a set of relays to enable spatial reuse while accounting for half-duplex nature of relays,
   assigning and reusing of channels across the relays (and associated users) in the two partitions to maximize the aggregate system throughput while ensuring proportional fairness comprising;
   grouping wireless sub-carriers to form one or more sub-channels, the grouping comprises a Partially Used Sub-channelization (PUSC) model;
   arranging relays in circular geometry while considering contiguous partitions of a relay set;
   for each contiguous partition, determining a schedule of maximum utility;
   determining a partition that provides the schedule of maximum utility;
   determining a user under each relay in every pair of relays that provides a maximum utility in the presence of finite buffer and interference for a considered channel;
   selecting a user pair that provides the maximum utility for the considered channel and adding the user pair to the schedule; and
   updating buffers of scheduled users.

7. A method for scheduling transmission in a relay-enabled two-hop wireless network, comprising:
   k. receiving a finite user buffer model;
   l. receiving a two-hop model with interference data for spatial reuse;
   m. receiving a PUSC and AMC model with user and channel data;
   n. performing a scheduling of unicast user data flows with spatial reuse gain and diversity; and
   grouping wireless sub-carriers to form one or more sub-channels, and one of a) said grouping comprising a distributed model while applying a 5/12 approximation and b) said grouping comprising a contiguous permutation model while applying a 3/4 approximation for a back-logged buffer or a 3/8 approximation for a finite buffer.

* * * * *